US011468683B2

(12) United States Patent
Genes et al.

(10) Patent No.: US 11,468,683 B2
(45) Date of Patent: *Oct. 11, 2022

(54) POPULATION DENSITY DETERMINATION FROM MULTI-CAMERA SOURCED IMAGERY

(71) Applicant: Royal Caribbean Cruises Ltd., Miami, FL (US)

(72) Inventors: Yunus Genes, Miami, FL (US); Victor Sevillano Plaza, Miami, FL (US)

(73) Assignee: Royal Caribbean Cruises Ltd., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/164,812

(22) Filed: Feb. 1, 2021

(65) Prior Publication Data

US 2021/0182571 A1    Jun. 17, 2021

Related U.S. Application Data

(63) Continuation of application No. 16/402,232, filed on May 3, 2019, now Pat. No. 10,909,388.

(51) Int. Cl.
*G06K 9/62* (2022.01)
*G06V 20/52* (2022.01)
*G06N 3/08* (2006.01)

(52) U.S. Cl.
CPC .......... *G06V 20/53* (2022.01); *G06K 9/6256* (2013.01); *G06N 3/08* (2013.01)

(58) Field of Classification Search
CPC .............. G06V 10/82; G06V 20/53; G06T 2207/20081; G06T 2207/20084;
(Continued)

(56) References Cited

U.S. PATENT DOCUMENTS

| 10,909,388 B2* | 2/2021 | Genes | G06V 20/53 |
| 2015/0310312 A1* | 10/2015 | Mongeon | G06V 20/53 |
| | | | 382/159 |

(Continued)

OTHER PUBLICATIONS

Yingying Zhang et al., "Single-Image Crowd Counting via Multi-Column Convolutional Neural Network", 2016 IEEE Conference on Computer Vision and Pattern Recognition, pp. 589-597. (Year: 2016).*

*Primary Examiner* — Brian Werner
(74) *Attorney, Agent, or Firm* — CRGO Global; Steven M. Greenberg

(57) ABSTRACT

A method for determining population density of a defined space from multi-camera sourced imagery includes loading a set of images acquired from multiple different cameras positioned about the defined space, locating different individuals within each of the images and computing a population distribution of the located different individuals in respect to different locations of the defined space. The method additionally includes submitting each of the images to a convolutional neural network as training data, each in association with a correspondingly computed population distribution. Subsequent to the submission, contemporaneous imagery from the different cameras is acquired in real time and submitted to the neural network, in response to which, a predicted population distribution for the defined space is received from the neural network. Finally, a message is displayed that includes information correlating at least a portion of the population distribution with a specific location of the defined space.

18 Claims, 2 Drawing Sheets

(58) Field of Classification Search
CPC .......... G06N 3/02–3/105; G06N 20/00–20/20; G06K 9/6256–9/6259
See application file for complete search history.

(56) References Cited

U.S. PATENT DOCUMENTS

2016/0358074 A1* 12/2016 Latapie ................ G06N 3/0454
2020/0118423 A1*  4/2020 Moura ..................... G08G 1/04

* cited by examiner

POPULATION DENSITY DETERMINATION FROM MULTI-CAMERA SOURCED IMAGERY

CROSS-REFERENCE TO RELATED APPLICATIONS

This application is a Continuation of U.S. patent application Ser. No. 16/402,232, filed May 2, 2019, the entirety of which is incorporated herein by reference.

BACKGROUND OF THE INVENTION

Field of the Invention

The present invention relates to the field of automated surveillance utilizing deep learning and more particularly to the determination of population density in a confined space utilizing deep learning.

Description of the Related Art

Video surveillance refers to the remote monitoring of a defined space through the use of one or more remotely positioned cameras. Initially, closed circuit coupled and analog in nature, modern video cameras can be small, solid-state cameras communicatively linked to a remote computing device over the global Internet. Video surveillance fulfills an important role in physical security and access control and has done so for many decades. But, video surveillance also can be viewed as an important tool for other purposes including intelligence gathering. One popular intelligence gathering task is that of crowd estimation.

In this regard, in order to estimate a number of individuals present within a defined space, a remotely acquired image of the defined space may be analyzed and each individual, e.g. human form or portion thereof, counted. With the advent of advanced forms of image processing, remotely acquired video imagery may be processed in real time by performing image segmentation upon acquired video imagery, identifying from the segmented imagery a number of objects classified as individual people, and counting those objects to produce a crowd estimate. However, knowing a crowd estimate for many applications is not enough.

Rather, it would be desirable to also know a distribution of the individual people in the defined space across different locations of the defined space. Even further, it would be helpful to know how the distribution of individuals within a defined space changes over time. But, in accordance with traditional crowd estimation tools, there is no mechanism for estimating the distribution of individuals in a defined space and the manner in which the distribution changes over time.

BRIEF SUMMARY OF THE INVENTION

Embodiments of the present invention address deficiencies of the art in respect to video surveillance and provide a novel and non-obvious method, system and computer program product for determining population density of a defined space from multi-camera sourced imagery. In an embodiment of the invention, a set of images, each acquired from a different one of a set of multiple different cameras positioned about the defined space, are loaded and different individual people (or portions thereof indicative of individual people, such as a head or partial body) are located within each of the images. Thereafter, a population distribution of the located different individuals is computed in respect to different locations of the defined space. Finally, each of the images is submitted to a convolutional neural network as training data, each in association with a correspondingly computed population distribution.

Subsequent to the submission of the images to the neural network as training data, contemporaneous imagery from the different cameras is acquired in real time and submitted to the neural network. Following the submission of the contemporaneous imagery to the neural network, a predicted population distribution for the defined space is received from the neural network. Finally, a message is displayed that includes information correlating at least a portion of the population distribution with a specific location of the defined space.

In one aspect of the embodiment, the message includes a heat map of the defined space in respect to the population distribution received from the neural network. In another aspect of the embodiment, the correlating includes an indication of a threshold density of individuals at the specific location. In this regard, the threshold density is a density that falls below threshold maximum number of individuals at the specific location. Or, conversely, the threshold density is a density that surpasses threshold minimum number of individuals at the specific location.

Finally, in even yet another aspect of the embodiment, newer, contemporaneous imagery may be repeatedly acquired from the different cameras, each then being submitted to the neural network. In response to each submission, a predicted population distribution for the defined space is then received from the neural network and a rate of change of the predicted population distribution computed in connection with the specific location based upon the receipt of a multiplicity of predicted population distributions for the defined space. Finally, an alert may be displayed in the display responsive to the rate of change exceeding a threshold value.

In another embodiment of the invention, an image acquisition computer data processing system is configured to determine population density of a defined space from multi-camera sourced imagery. The system includes a host computing system that has one or more computers, each with at least one processor and memory. The system also includes a multiplicity of different cameras positioned about a defined space and communicatively coupled to the host computing system. The system yet further includes a data store of previously acquired imagery of the defined space by the different cameras. Finally, the system includes a population density determination module.

The module includes program instructions that are enabled during execution in the memory of the host computing system to load into the memory from the data store, a set of previously acquired images, locate different individuals within each of the images and compute a population distribution of the located different individuals in respect to different locations of the defined space. The program instructions further are enabled to submit each of the images to a convolutional neural network as training data, each in association with a correspondingly computed population distribution. Subsequent to the submission of the images to the neural network as training data, The program instructions are enabled to acquire, in real-time, contemporaneous imagery from the different cameras, submit each of the contemporaneous imagery to the neural network, and receive in response from the neural network, a predicted population distribution for the defined space. Finally, the program instructions are enabled to display a message in a display of the host computing system, the message encapsulating information correlating at least a portion of the population distribution with a specific location of the defined space.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for the determination of population density from multi-camera sourced imagery. In accordance with an embodiment of the invention, different images of defined space are retrieved in respect to different cameras positioned about the defined space. For each of the different images, a position is determined within the image of each individual visible in the image and a distribution map may be computed for the positions of the different individuals within the image. Each different image in correspondence with the computed distribution is then provided as training data to a convolutional neural network correlating the different images with the corresponding distributions of the positions of the individuals. Thereafter, the different cameras capture live imagery of the defined space. The live imagery is submitted to the trained convolutional neural network and a prediction as to a distribution for the live imagery and corresponding confidence is retrieved from the convolutional neural network. Based upon the prediction of the distribution, a message can then be transmitted specifying a correspondence between the distribution and a specific location of the defined space, or conversely a lack of correspondence between the distribution and another location of the defined space.

Figure 1:
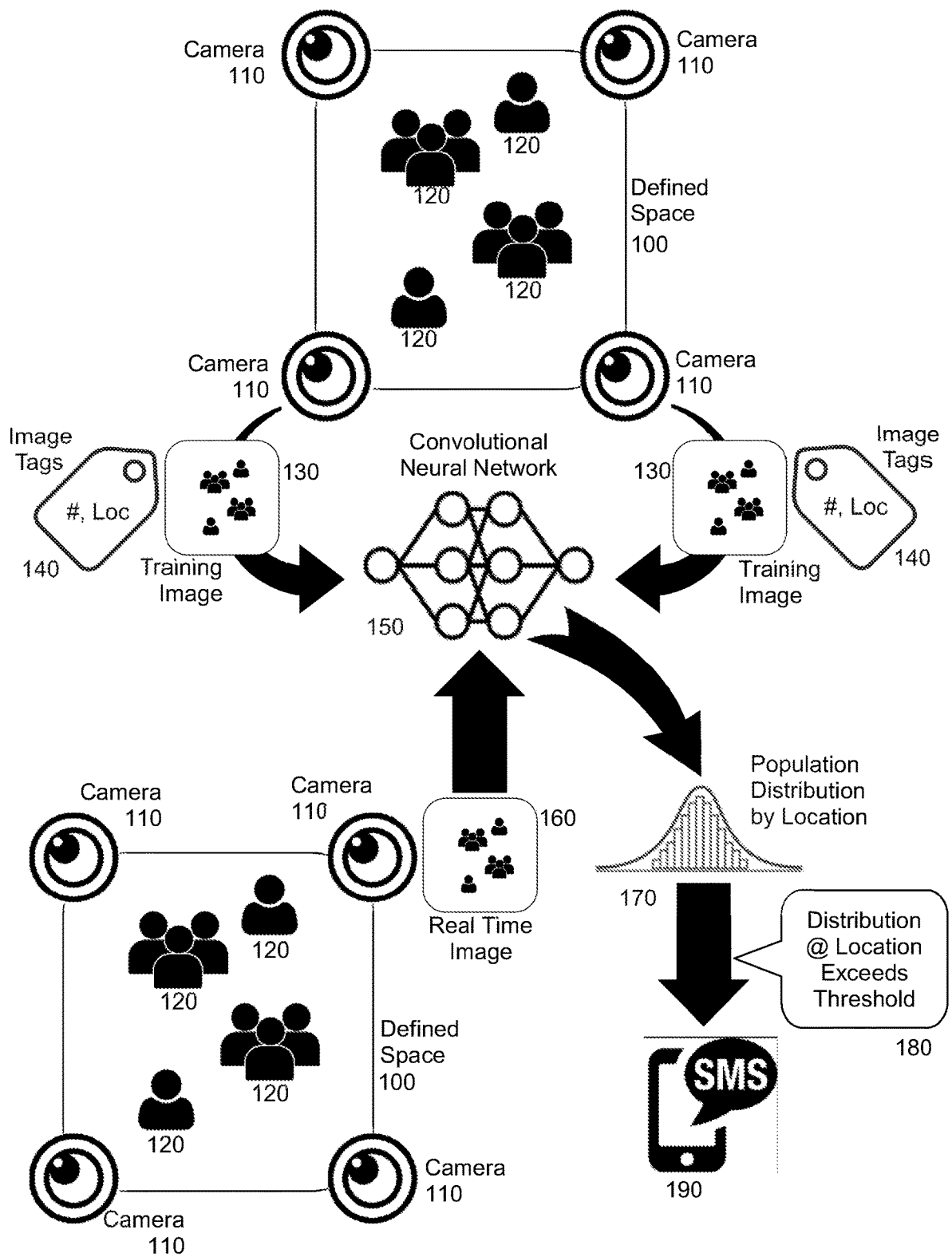
FIG. 1 is a pictorial illustration of a process for determining population density of a defined space from multi-camera sourced imagery.

In further illustration, FIG. 1 is a pictorial illustration of a process for determining population density of a defined space from multi-camera sourced imagery. As shown in FIG. 1, a multiplicity of cameras 110 are positioned about a defined space 100, whether at the perimeter of the defined space 100, or within the defined space 100. Each of the cameras 100 may be positioned anywhere within the three-dimensional volume of the defined space 100 including on the floor, ceiling, wall or upon a supporting object positioned within the defined space 100. Each of the cameras 110 acquires training imagery 130 of the defined space 100 including the different individuals 120 present therein.

A location of the each of the individuals 120 within the defined space 100 is then determined from the training imagery 130, either through automatic tagging by way of image segmentation and object counting, followed by correlating each object counted with a pixel location of the training imagery 130, or through manually tagging in which the location within the training imagery 130 of each object classified as an individual person is recorded in meta-data in connection with the location. Optionally, other objects can be classified and located in the training imagery 130 so as to locate each individual relative to other classified objects such as tables, areas of ingress and egress, perimeter structure such as a wall, window, fencing or railing, or a kiosk.

Thereafter, the training imagery 130 along with corresponding tagging 140 indicating a number of individuals at each location in the training imagery 130 is presented to a convolutional neural network 150. The training imagery 130 serves to train the neural network 150 in predicting a number of individuals at different locations in imagery so as to produce a population distribution 170 by location of a supplied real-time image 160. Consequently, during operation, the cameras 110 acquire the real time imagery 160 of the defined space 100 including a number of individuals 120 present within the defined space 100 and present as input the real time imagery 160 to the now trained convolutional neural network 150. The convolutional neural network 150 responds with a resultant prediction of population distribution by location 170 either in coordinate terms of the real time imagery 160, or in relative terms to other classified objects in the real time imagery 160.

Finally, a determination is made whether or not a threshold number of individuals 120 represented in the population distribution by location 170 are present in connection with a specific location in the defined space 100. Alternatively, a determination is made whether or not a threshold number of individuals 120 represented in the population distribution by location 170 are absent in connection with a specific location in the defined space 100. As yet another alternative, a sequence of the real time images 160 captured over time can be produce different instances of the population distribution by location 170 such that a threshold rate of change of population distribution with respect to a particular location in the defined space 100 may be computed. To the extent that a thresholding rule 180 is triggered, messaging 190 can be activated to alert a relevant end user to the observed population distribution threshold event.

Figure 2:
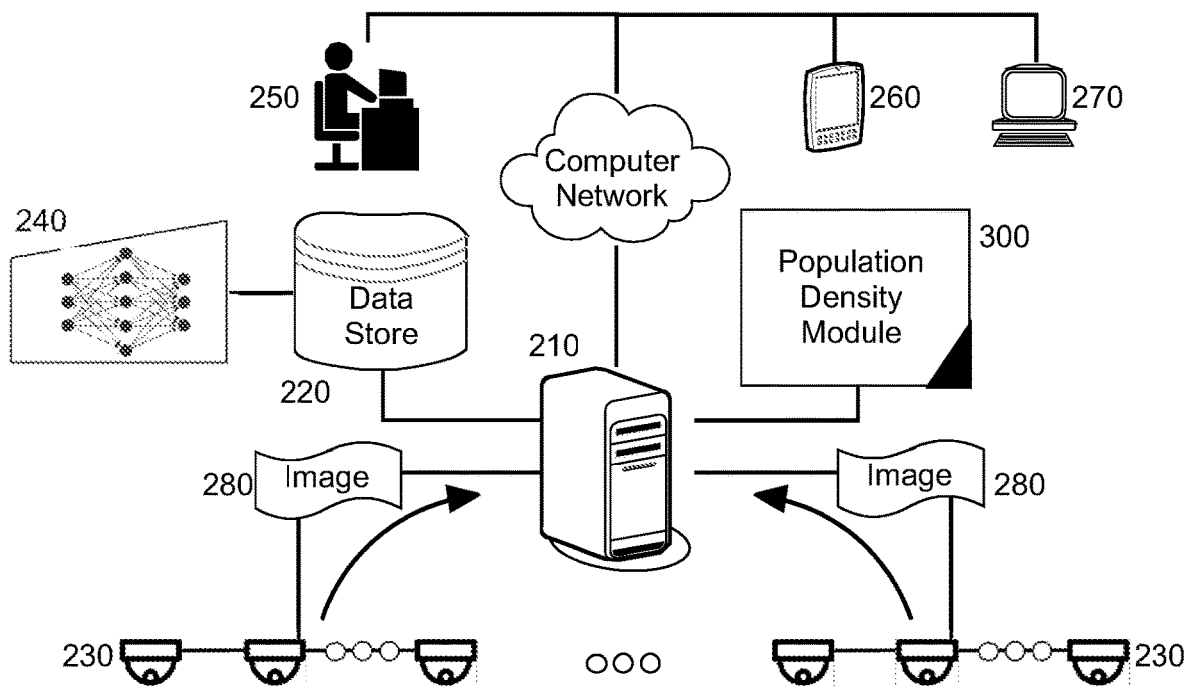
FIG. 2 is a schematic illustration of an image acquisition data processing system configured for determining population density of a defined space from multi-camera sourced imagery; and, FIG. 3 is a flow chart illustrating a process for determining population density of a defined space from multi-camera sourced imagery.

The process described in connection with FIG. 1 is implemented in a data processing system. In further illustration, FIG. 2 schematically shows an image acquisition data processing system configured for determining population density of a defined space from multi-camera sourced imagery. The system includes a host computing system 210 with one or more computers (only a single computer shown for ease of illustration), each with memory and at least one processor. The host computing system 210 is coupled by way of computer communications network 290 to different end users utilizing different end user devices such as desktop computing devices 270, mobile computing devices 260, and the like.

The host computing system 210 is further communicatively linked to a network of cameras 230, for instance one or more fish-eye lens, dome mounted charge coupled device cameras, each disposed in one of a selection of different defined spaces such that different sets of one or more of the cameras 230 produce imagery 280 for different corresponding ones of the defined spaces, and transmit the imagery 280 to the host computing system 210. The host computing system 210 further includes a data store 220 storing therein a convolutional neural network 240. The convolutional neural network 240 is a multi-layer deep neural network trained with respect to training instances of the imagery 280 from the cameras 230 for each corresponding defined space to correlate the training instances of the imagery 280 to respective population distributions for the corresponding defined spaces so that the population distributions each specify a number of individuals recognized to be present in proximity to different specific locations in the defined spaces.

Notably, the host computing system 210 includes a population density module 300. The population density module 300 includes computer program instructions that when executed in the memory of the host computing system 210, are enabled to receive real time instances of the imagery 280 from the cameras 230 for respective ones of the defined spaces. For a received one of the real time instances of the imagery 280, the program instructions submit the received one of the real time instances of the imagery 280 to the convolutional neural network 240 in order to receive in response, a predicted population distribution of individuals visible within the received one of the real time instances of the imagery 280 in connection with an associated defined space. Thereafter, the program instructions are enabled to apply different action rules acting upon threshold events evident from the predicted population distribution including displaying to an end user 250, population distribution data on a display of a user interface to the population density module 300, or transmitting messaging pertaining to the predicted population distribution to one or more of the coupled computing devices 260, 270.

Figure 3:
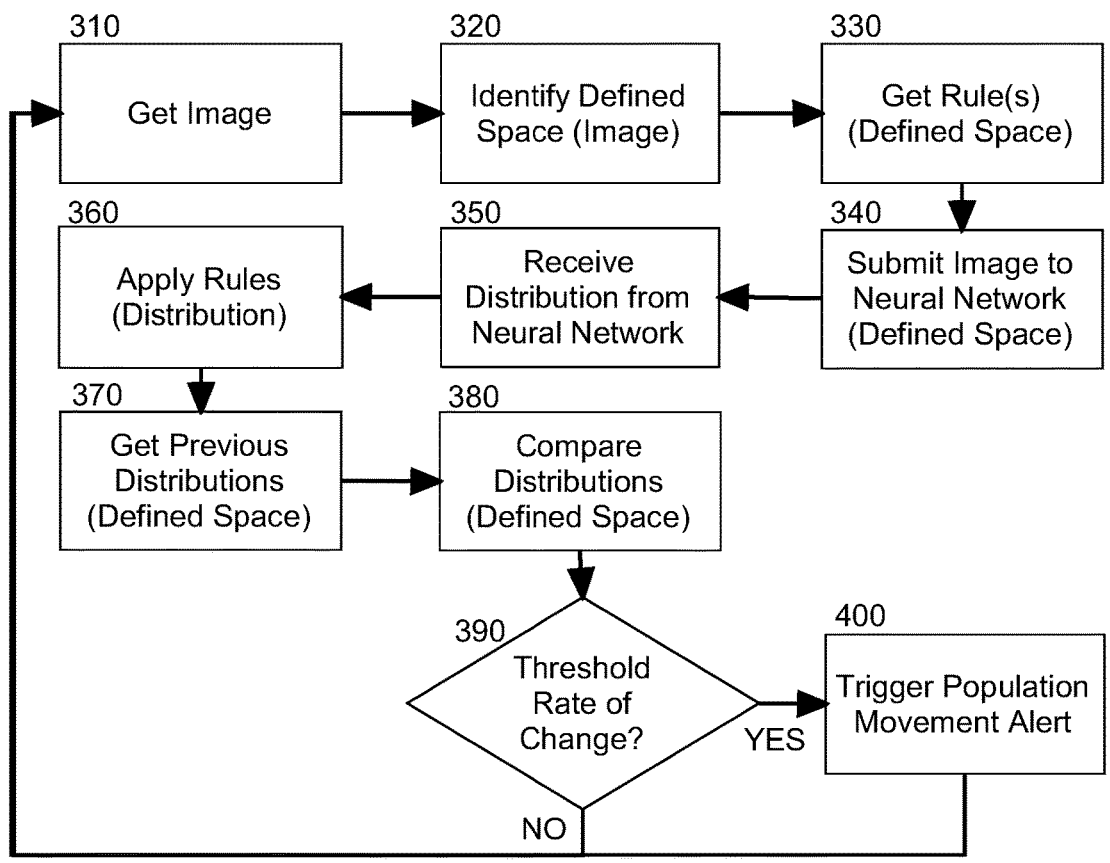

In even further illustration of the operation of the population density module 300, FIG. 3 is a flow chart illustrating a process for determining population density of a defined space from multi-camera sourced imagery. Beginning in block 310, a real time image is received from a camera disposed in a defined space. In block 320, the defined space for the received image is determined and in block 330, one or more rules pertaining to processing population distribution data for the determined defined space are retrieved from memory. In block 340, the received image is then transmitted to the convolutional neural network in connection with the determined defined space, recognizing that one convolutional neural network may be singularly trained to produce population distributions for a single defined space, thereby requiring the use of a neural network specific to the determined defined space, or that one convolutional neural network may be trained for multiple defined spaces obviating the need to select a specific neural network correspondent to the determined defined space.

In block 350, a predicted population distribution is received from the neural network and in block 360, the retrieved rules are applied to the predicted population distribution. Thereafter, previously retrieved population distributions are retrieved for the defined space in block 370 and in block 380, the previously retrieved population distributions are compared to one another in time sequence in order to compute a rate of change of population distribution (tantamount to a movement of the individuals within the space from one location to another). In decision block 390, if a threshold change in population distribution in respect to one or more locations in the defined space is computed, in block 400, an alert is generated and transmitted to an end user device indicating a threshold movement of the population in the defined space.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows.

We claim:

1. A method for redistributing a population according to a determined population density of a defined space from multi-camera sourced imagery comprising:
    loading into memory of a computer data processing system, a set of images each acquired from a different one of a set of multiple different cameras positioned about the defined space;
    identifying the defined space and retrieving a rule for acting upon a determined population density in the identified defined space;
    locating different individuals within each of the images and computing a population distribution of the located different individuals in respect to different locations of the defined space;
    submitting each of the images to a convolutional neural network as training data, each in association with a correspondingly computed population distribution;
    subsequent to the submission of the images to the neural network as training data, acquiring in real-time, contemporaneous imagery from the different cameras, submitting each of the contemporaneous imagery to the neural network, and receiving in response from the neural network, a predicted population distribution for the defined space; and,
    applying the retrieved rule to determine an action for the defined space and transmitting a message to a mobile computing device with the action.

2. The method of claim 1, wherein the message includes a heat map of the defined space in respect to the population distribution received from the neural network.

3. The method of claim 1, wherein the correlating includes an indication of a threshold density of individuals at the specific location.

4. The method of claim 3, wherein the threshold density is a density that falls below threshold maximum number of individuals at the specific location.

5. The method of claim 3, wherein the threshold density is a density that surpasses threshold minimum number of individuals at the specific location.

6. The method of claim 1, further comprising:
    repeatedly acquiring in real-time, newer contemporaneous imagery from the different cameras, submitting each of the newer contemporaneous imagery to the neural network, and receiving in response to each submission from the neural network, a predicted population distribution for the defined space;
    computing a rate of change of the predicted population distribution in connection with the specific location based upon the receipt of a multiplicity of predicted population distributions for the defined space; and,
    displaying an alert in the display responsive to the rate of change exceeding a threshold value.

7. An image acquisition computer data processing system configured to redistributing a population according to a determined population density of a defined space from multi-camera sourced imagery, the system comprising:
    a host computing system comprising one or more computers, each with at least one processor and memory;
    a multiplicity of different cameras positioned about a defined space and communicatively coupled to the host computing system;
    a data store of previously acquired imagery of the defined space by the different cameras; and,
    a population density determination module comprising program instructions enabled during execution in the memory of the host computing system to perform:
        identifying the defined space and retrieving a rule for acting upon a determined population density in the identified defined space;
        locating different individuals within each of the images and computing a population distribution of the located different individuals in respect to different locations of the defined space;
        submitting each of the images to a convolutional neural network as training data, each in association with a correspondingly computed population distribution;
        subsequent to the submission of the images to the neural network as training data, acquiring in real-time, contemporaneous imagery from the different cameras, submitting each of the contemporaneous imagery to the neural network, and receiving in response from the neural network, a predicted population distribution for the defined space; and,
        applying the retrieved rule to determine an action for the defined space and transmitting a message to a mobile computing device with the action.

8. The system of claim 7, wherein the message includes a heat map of the defined space in respect to the population distribution received from the neural network.

9. The system of claim 7, wherein the correlating includes an indication of a threshold density of individuals at the specific location.

10. The system of claim 9, wherein the threshold density is a density that falls below threshold maximum number of individuals at the specific location.

11. The system of claim 9, wherein the threshold density is a density that surpasses threshold minimum number of individuals at the specific location.

12. The system of claim 7, wherein the program instructions are further enabled to perform:
repeatedly acquiring in real-time, newer contemporaneous imagery from the different cameras, submitting each of the newer contemporaneous imagery to the neural network, and receiving in response to each submission from the neural network, a predicted population distribution for the defined space;
computing a rate of change of the predicted population distribution in connection with the specific location based upon the receipt of a multiplicity of predicted population distributions for the defined space; and,
displaying an alert in the display responsive to the rate of change exceeding a threshold value.

13. A computer program product for redistributing a population according to a determined population density of a defined space from multi-camera sourced imagery, the computer program product including a non-transitory computer readable storage medium having program instructions embodied therewith, the program instructions executable by a device to cause the device to perform a method including:
identifying the defined space and retrieving a rule for acting upon a determined population density in the identified defined space;
locating different individuals within each of the images and computing a population distribution of the located different individuals in respect to different locations of the defined space;
submitting each of the images to a convolutional neural network as training data, each in association with a correspondingly computed population distribution;
subsequent to the submission of the images to the neural network as training data, acquiring in real-time, contemporaneous imagery from the different cameras, submitting each of the contemporaneous imagery to the neural network, and receiving in response from the neural network, a predicted population distribution for the defined space; and,
applying the retrieved rule to determine an action for the defined space and transmitting a message to a mobile computing device with the action.

14. The computer program product of claim 13, wherein the message includes a heat map of the defined space in respect to the population distribution received from the neural network.

15. The computer program product of claim 13, wherein the correlating includes an indication of a threshold density of individuals at the specific location.

16. The computer program product of claim 15, wherein the threshold density is a density that falls below threshold maximum number of individuals at the specific location.

17. The computer program product of claim 15, wherein the threshold density is a density that surpasses threshold minimum number of individuals at the specific location.

18. The computer program product of claim 13, wherein the method further comprises:
repeatedly acquiring in real-time, newer contemporaneous imagery from the different cameras, submitting each of the newer contemporaneous imagery to the neural network, and receiving in response to each submission from the neural network, a predicted population distribution for the defined space;
computing a rate of change of the predicted population distribution in connection with the specific location based upon the receipt of a multiplicity of predicted population distributions for the defined space; and,
displaying an alert in the display responsive to the rate of change exceeding a threshold value.

* * * * *